(12) United States Patent
Mukherjee

(10) Patent No.: US 9,918,094 B2
(45) Date of Patent: Mar. 13, 2018

(54) COMPRESSING AND REPRESENTING MULTI-VIEW VIDEO

(71) Applicant: GOOGLE INC., Mountain View, CA (US)

(72) Inventor: Debargha Mukherjee, Cupertino, CA (US)

(73) Assignee: Google LLC, Mountain View, CA (US)

( * ) Notice: Subject to any disclaimer, the term of this patent is extended or adjusted under 35 U.S.C. 154(b) by 304 days.

(21) Appl. No.: 14/519,006

(22) Filed: Oct. 20, 2014

(65) Prior Publication Data
US 2016/0112705 A1    Apr. 21, 2016

(51) Int. Cl.
| | |
|---|---|
| *H04N 7/12* | (2006.01) |
| *H04N 19/17* | (2014.01) |
| *H04N 19/597* | (2014.01) |
| *H04N 19/61* | (2014.01) |
| *H04N 19/124* | (2014.01) |
| *H04N 19/154* | (2014.01) |
| *H04N 19/167* | (2014.01) |
| *H04N 19/12* | (2014.01) |

(52) U.S. Cl.
CPC ......... *H04N 19/17* (2014.11); *H04N 19/124* (2014.11); *H04N 19/154* (2014.11); *H04N 19/167* (2014.11); *H04N 19/597* (2014.11); *H04N 19/61* (2014.11); *H04N 19/12* (2014.11)

(58) Field of Classification Search
CPC .................................................. H04N 19/597
See application file for complete search history.

(56) References Cited

U.S. PATENT DOCUMENTS

| | | |
|---|---|---|
| 6,356,297 B1 | 3/2002 | Cheng et al. |
| 2001/0050955 A1 | 12/2001 | Zhang et al. |
| 2006/0034374 A1 | 2/2006 | Park et al. |

FOREIGN PATENT DOCUMENTS

| | | |
|---|---|---|
| EP | 1162830 A2 | 12/2001 |
| EP | 2645713 A1 | 10/2013 |
| WO | 2016064862 | 4/2016 |

OTHER PUBLICATIONS

International Search Report and Written Opinion received for PCT Patent Application No. PCT/US2015/056442, dated Feb. 18, 2016, 14 pages.

*Primary Examiner* — Young Lee
(74) *Attorney, Agent, or Firm* — Brake Hughes Bellermann LLP

(57) ABSTRACT

In a general aspect, a method includes determining a tile position in a frame of a spherical video based on a view perspective, selecting a first portion of the frame of the spherical video as a first two dimensional tile based on the tile position, selecting a plurality of second two dimensional tiles from a second portion of the frame of the spherical video, the second portion of the frame surrounding the first portion of the frame and extending away from the first portion of the frame, encoding the first two dimensional tile using a first quality, encoding the plurality of second two dimensional tiles using at least one second quality, and transmitting a packet, as a streaming spherical video, the packet including the encoded first two dimensional tile and the plurality of encoded second two dimensional tiles.

13 Claims, 12 Drawing Sheets

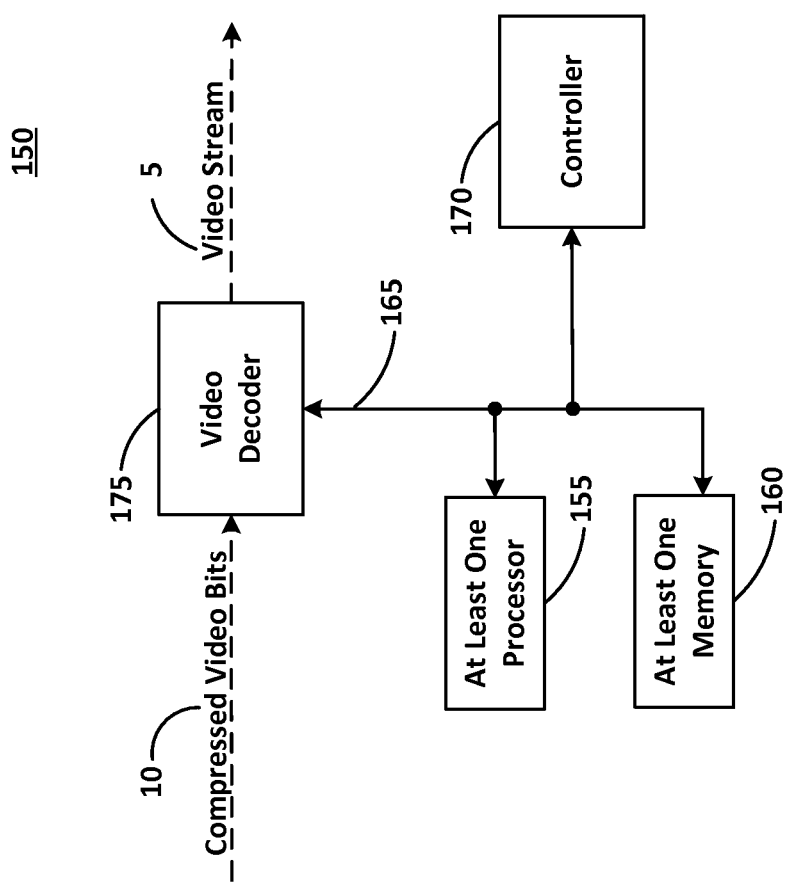

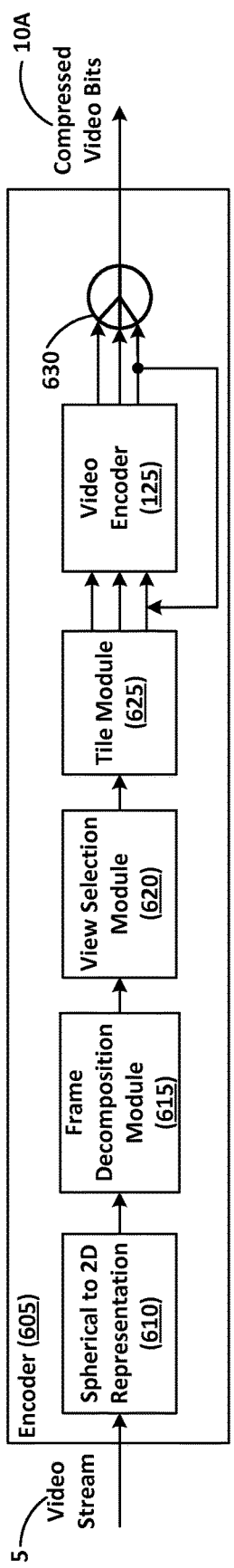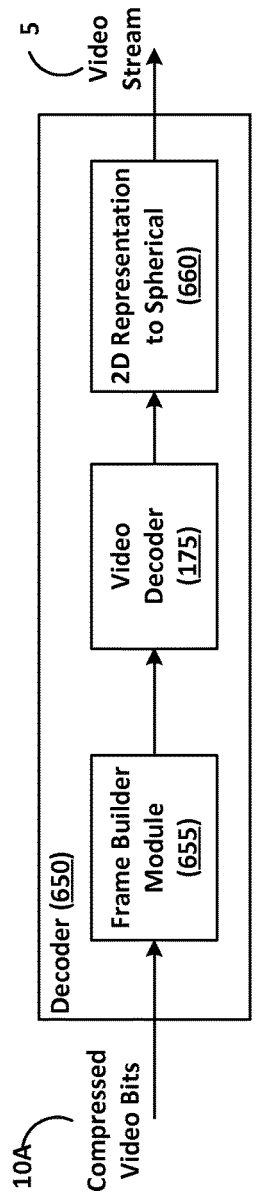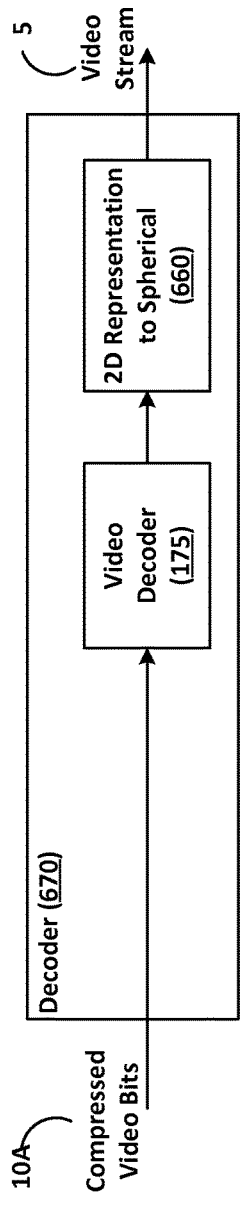
FIG. 6A
FIG. 6B
FIG. 6C

COMPRESSING AND REPRESENTING MULTI-VIEW VIDEO

FIELD

Embodiments relate to streaming spherical video.

BACKGROUND

Streaming spherical video (or other three dimensional video) can consume a significant amount of system resources. For example, an encoded spherical video can include a large number of bits for transmission which can consume a significant amount of bandwidth as well as processing and memory associated with encoders and decoders.

SUMMARY

Example embodiments describe systems and methods to optimize streaming spherical video (and/or other three dimensional video) based on visible (by a viewer of a video) portions of the spherical video.

In a general aspect, a method includes determining a tile position in a frame of a spherical video based on a view perspective, selecting a first portion of the frame of the spherical video as a first two dimensional tile based on the tile position, selecting a plurality of second two dimensional tiles from a second portion of the frame of the spherical video, the second portion of the frame surrounding the first portion of the frame and extending away from the first portion of the frame, encoding the first two dimensional tile using a first quality, encoding the plurality of second two dimensional tiles using at least one second quality, and transmitting a packet, as a streaming spherical video, the packet including the encoded first two dimensional tile and the plurality of encoded second two dimensional tiles.

Implementations can include one or more of the following features. For example, the method can further include mapping the frame of the spherical video to a two dimensional representation based on a projection to a surface of a two dimensional shape. The first quality is a higher quality as compared to the at least one second quality. The view perspective is based on a viewable portion of the spherical video as seen by a viewer during a playback of the spherical video. For example, the method can further include receiving an indication of the view perspective from a device executing a playback of the spherical video. The packet further includes a header and a mimicked frame including dummy data in data locations of the frame that are not associated with encoded first two dimensional tile and the plurality of encoded second two dimensional tiles. The plurality of encoded second two dimensional tiles include two or more two dimensional tiles of different sizes and the two or more two dimensional tiles overlap each other. As the plurality of second two dimensional tiles extend away from the first portion of the frame, the plurality of second two dimensional tiles includes a third tile that has a dimension that is larger as compared to a dimension of a fourth tile that is closer to the first tile.

The plurality of second two dimensional tiles including tiles of differing dimensions, and a larger of the tiles of differing dimensions is encoded with a lower quality as compared to a smaller of the tiles of differing dimensions. The encoding of the first two dimensional tile and of the plurality of second two dimensional tiles can include separately encoding each tile the encoding can include generating at least one residual for the two dimensional tile by subtracting a template from un-encoded pixels of a block of the two dimensional tile to be encoded, encoding the at least one residual by applying a transform to a residual block including the at least one residual, quantizing transform coefficients associated with the encoded at least one residual, and entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality.

In a general aspect, a method includes receiving an encoded bit stream including a plurality of encoded two dimensional tiles selected from a frame of a spherical video, decoding a two dimensional representation based on the plurality of encoded two dimensional tiles, converting the two dimensional representation to a spherical video frame, and playing back the spherical video including the spherical video frame. The spherical video frame can include a higher quality tile associated with a portion of the spherical video frame at a view perspective as seen by a viewer as compared to a portion of the spherical video frame at a peripheral view or outside the view perspective during the playback of the spherical video.

Implementations can include one or more of the following features. For example, the method can further include generating the two dimensional representation based on a mimicked frame of the spherical video including dummy data in data locations of the frame that are not associated with the plurality of encoded two dimensional tiles. The converting of the two dimensional representation of the spherical video frame includes mapping the two dimensional representation of the spherical video frame to a spherical image using an inverse of a technique used to map the spherical video frame to the two dimensional representation of the spherical video frame. For example, the method can further include determining the view perspective as seen by a viewer has changed, and upon determining the view perspective has changed, triggering an indication of the changed view perspective to a device executing an encoding of the spherical video.

In a general aspect, a non-transitory computer-readable storage medium having stored thereon computer executable program code which, when executed on a computer system, causes the computer system to perform steps including determining a tile position in a frame of a spherical video based on a view perspective, selecting a first portion of the frame of the spherical video as a first two dimensional tile based on the tile position, selecting a plurality of second two dimensional tiles from a second portion of the frame of the spherical video, the second portion of the frame surrounding the first portion of the frame and extending away from the first portion of the frame, encoding the first two dimensional tile using a first quality, encoding the plurality of second two dimensional tiles using at least one second quality, and transmitting a packet, as a streaming spherical video, the packet including the encoded first two dimensional tile and the plurality of encoded second two dimensional tiles.

Implementations can include one or more of the following features. For example, the first quality is a higher quality as compared to the at least one second quality. The view perspective is based on a viewable portion of the spherical video as seen by a viewer during a playback of the spherical video. The steps can further include receiving an indication of the view perspective from a device executing a playback of the spherical video. The plurality of encoded second two dimensional tiles include two or more two dimensional tiles of different sizes and the two or more two dimensional tiles overlap each other. As the plurality of second two dimensional tiles extend away from the first portion of the frame, the plurality of second two dimensional tiles includes a third tile that has a dimension that is larger as compared to a dimension of a fourth tile that is closer to the first tile.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 1B illustrates a video decoder system according to at least one example embodiment.

FIG. 6A illustrates a flow diagram for a video encoder system according to at least one example embodiment.

FIGS. 6B and 6C illustrate flow diagrams for a video decoder system according to at least one example embodiment.

Figure 1A:
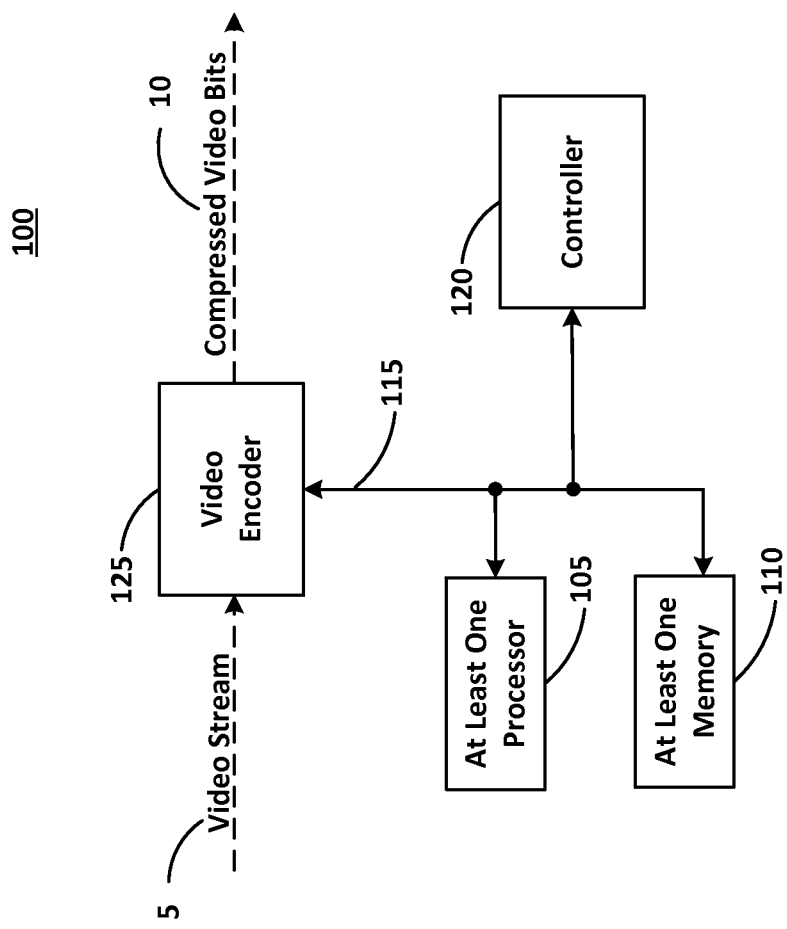
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, an encoder can encode a spherical video frame (or image) as a plurality of tiles. The tiles can have varying sizes and quality. The sizes and quality can be based on a view perspective of a viewer of the spherical video during a playback. The tiles can be streamed and decoded. The decoded tiles are then used to generate a spherical video frame.

In the example of FIG. 1A, a video encoder system 100 may be, or include, at least one computing device and can represent virtually any computing device configured to perform the methods described herein. As such, the video encoder system 100 can include various components which may be utilized to implement the techniques described herein, or different or future versions thereof. By way of example, the video encoder system 100 is illustrated as including at least one processor 105, as well as at least one memory 110 (e.g., a non-transitory computer readable storage medium).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be utilized to execute instructions stored on the at least one memory 110, so as to thereby implement the various features and functions described herein, or additional or alternative features and functions. The at least one processor 105 and the at least one memory 110 may be utilized for various other purposes. In particular, the at least one memory 110 can represent an example of various types of memory and related hardware and software which might be used to implement any one of the modules described herein.

The at least one memory 110 may be configured to store data and/or information associated with the video encoder system 100. For example, the at least one memory 110 may be configured to store codecs associated with encoding spherical video and images and generating and/or selecting tiles corresponding to a viewers perspective. The at least one memory 110 may be a shared resource. For example, the video encoder system 100 may be an element of a larger system (e.g., a server, a personal computer, a mobile device, and the like). Therefore, the at least one memory 110 may be configured to store data and/or information associated with other elements (e.g., image/video serving, web browsing or wired/wireless communication) within the larger system.

The controller 120 may be configured to generate various control signals and communicate the control signals to various blocks in video encoder system 100. The controller 120 may be configured to generate the control signals to implement the techniques described below. The controller 120 may be configured to control the video encoder 125 to encode an image, a sequence of images, a video frame, a video sequence, and the like according to example embodiments. For example, the controller 120 may generate control signals corresponding to implementing codecs associated with encoding spherical video and images and generating and/or selecting tiles corresponding to a viewers perspective. More details related to the functions and operation of the video encoder 125 and controller 120 will be described below in connection with at least FIGS. 1A, 2A, 6A and 7.

The video encoder 125 may be configured to receive a video stream input 5 and output compressed (e.g., encoded) video bits 10. The video encoder 125 may convert the video stream input 5 into discrete video frames. The video stream input 5 may also be an image, accordingly, the compressed (e.g., encoded) video bits 10 may also be compressed image bits. The video encoder 125 may further convert each discrete video frame (or image) into a matrix of blocks (hereinafter referred to as blocks). For example, a video frame (or image) may be converted to a matrix of blocks each having a number of pixels. Although five example matrices are listed, example embodiments are not limited thereto.

The compressed video bits 10 may represent the output of the video encoder system 100. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., image/video serving, web browsing or wired/wireless communication) within the larger system.

In the example of FIG. 1B, a video decoder system 150 may be at least one computing device and can represent virtually any computing device configured to perform the methods described herein. As such, the video decoder system 150 can include various components which may be utilized to implement the techniques described herein, or different or future versions thereof. By way of example, the video decoder system 150 is illustrated as including at least one processor 155, as well as at least one memory 160 (e.g., a computer readable storage medium).

Thus, the at least one processor 155 may be utilized to execute instructions stored on the at least one memory 160, so as to thereby implement the various features and functions described herein, or additional or alternative features and functions. The at least one processor 155 and the at least one memory 160 may be utilized for various other purposes. In particular, the at least one memory 160 can represent an example of various types of memory and related hardware and software which might be used to implement any one of the modules described herein. According to example embodiments, the video encoder system 100 and the video decoder system 150 may be included in a same larger system (e.g., a personal computer, a mobile device and the like).

The at least one memory 160 may be configured to store data and/or information associated with the video decoder system 150. For example, the at least one memory 110 may be configured to store codecs associated with decoding streaming spherical video and images and generating a playback spherical video based on tiles corresponding to a viewers perspective. The at least one memory 160 may be a shared resource. For example, the video decoder system 150 may be an element of a larger system (e.g., a personal computer, a mobile device, and the like). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals in order to implement the video decoding techniques described below. The controller 170 may be configured to control the video decoder 175 to decode a video frame according to example embodiments. The controller 170 may be configured to generate control signals corresponding to implementing codecs associated with decoding streaming spherical video and images and generating a playback spherical video based on tiles corresponding to a viewers perspective. More details related to the functions and operation of the video decoder 175 and controller 170 will be described below in connection with at least FIGS. 1B, 2B, 6B, 6C and 8.

The video decoder 175 may be configured to receive a compressed (e.g., encoded) video bits 10 input and output a video stream 5. The video decoder 175 may convert discrete video frames of the compressed video bits 10 into the video stream 5. The compressed (e.g., encoded) video bits 10 may also be compressed image bits, accordingly, the video stream 5 may also be an image.

The at least one processor 155 may be configured to execute computer instructions associated with the controller 170 and/or the video decoder 175. The at least one processor 155 may be a shared resource. For example, the video decoder system 150 may be an element of a larger system (e.g., a personal computer, a mobile device, and the like). Therefore, the at least one processor 155 may be configured to execute computer instructions associated with other elements (e.g., web browsing or wireless communication) within the larger system.

Figure 2A:
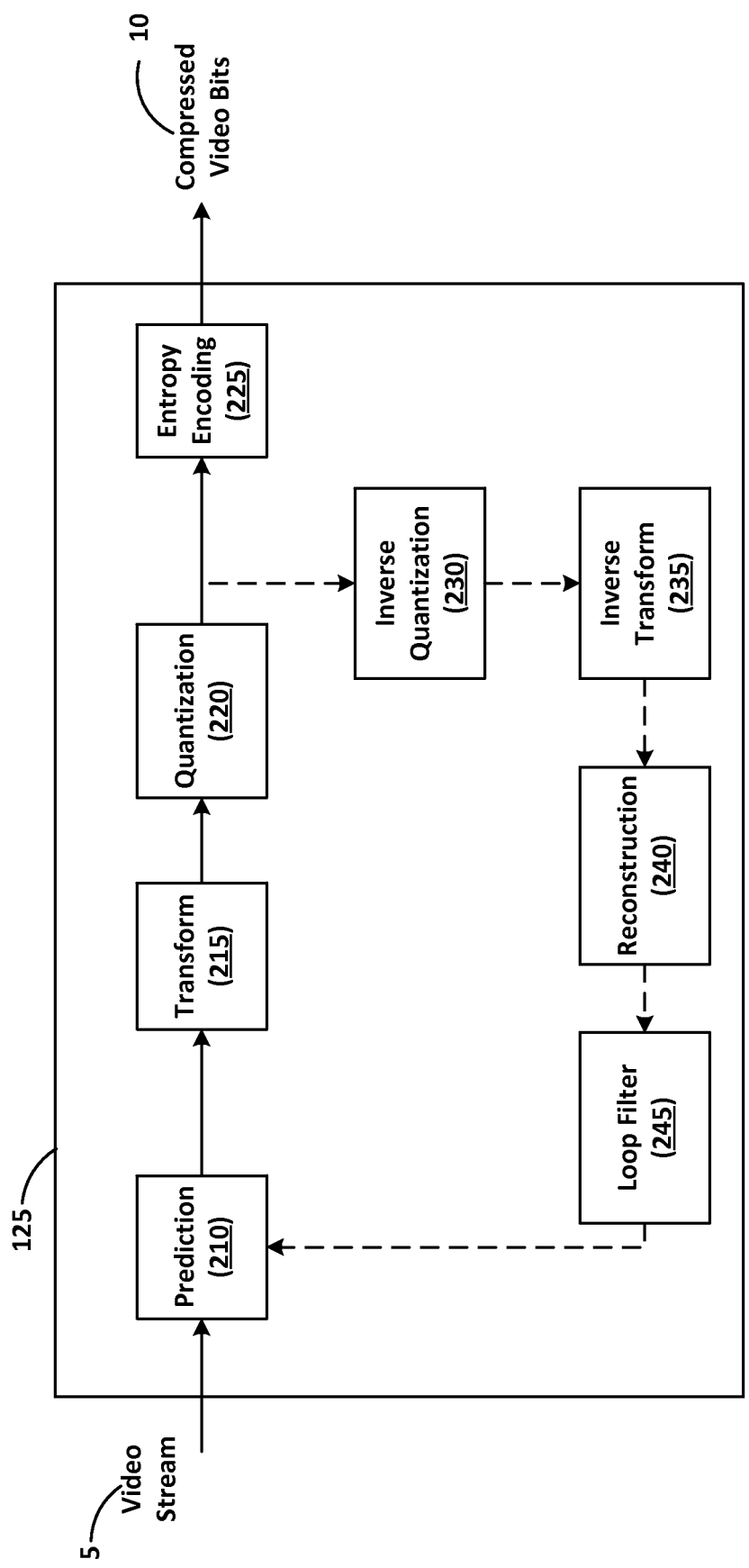
FIG. 2A illustrates a flow diagram for a video encoder system according to at least one example embodiment.
Figure 2B:
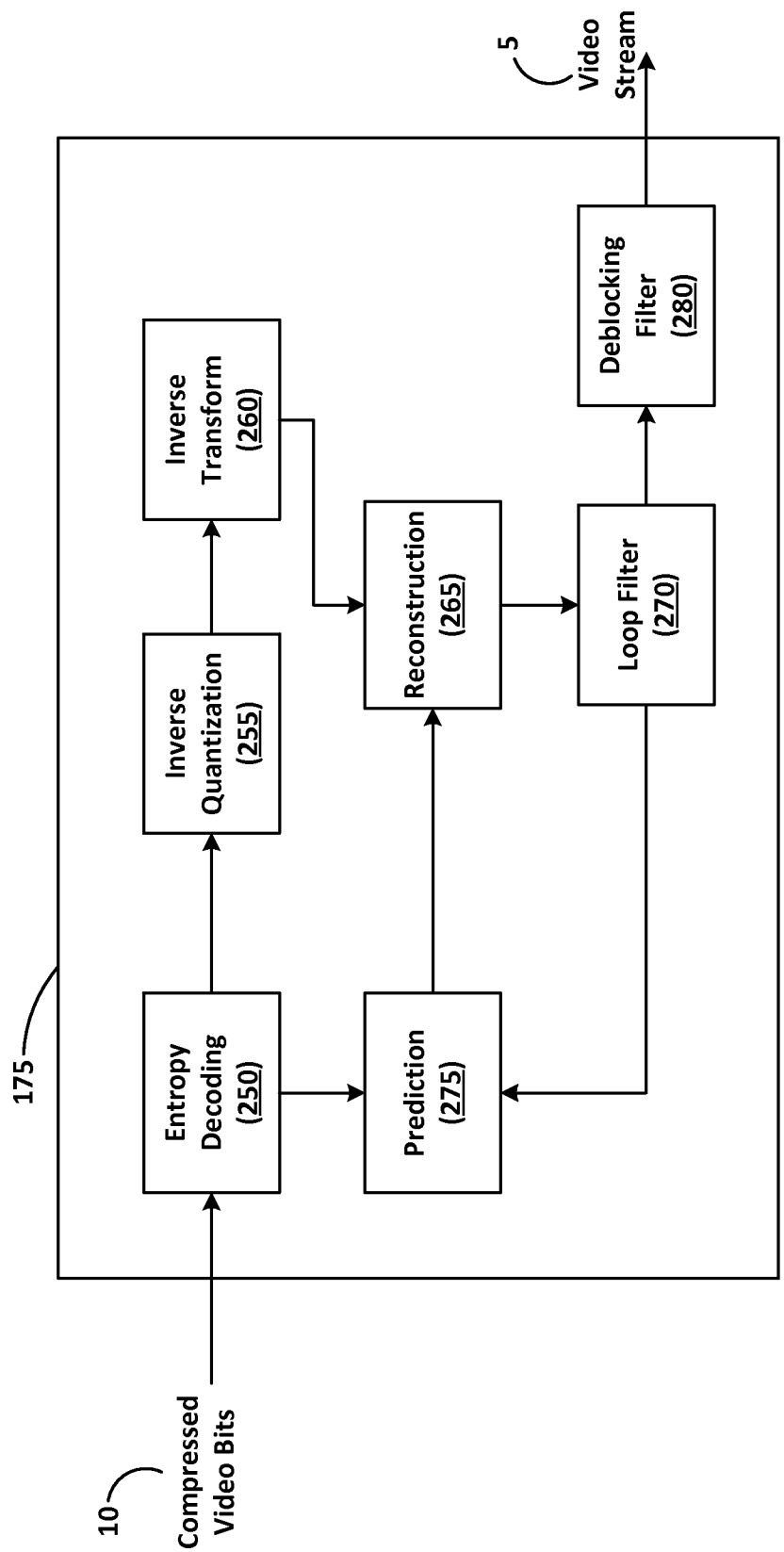
FIG. 2B illustrates a flow diagram for a video decoder system according to at least one example embodiment.

FIGS. 2A and 2B illustrate a flow diagram for the video encoder 125 shown in FIG. 1A and the video decoder 175 shown in FIG. 1B, respectively, according to at least one example embodiment. The video encoder 125 (described above) includes a prediction block 210, a transform block 215, a quantization block 220, an entropy encoding block 225, an inverse quantization block 230, an inverse transform block 235, a reconstruction block 240, and a loop filter block 245. Other structural variations of video encoder 125 can be used to encode input video stream 5. As shown in FIG. 2A, dashed lines represent a reconstruction path amongst the several blocks and solid lines represent a forward path amongst the several blocks.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 215 and/or the quantization block 220.

The prediction block 210 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 225) and entropy coding (e.g., entropy encoding block 225) part of a predictive transform codec. Inter-frame prediction relates to predicting the pixel values in a block of a picture relative to data of a previously coded picture.

The transform block 215 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 215 may be configured to transform the residual (from the prediction block 210) into transform coefficients in, for example, the frequency domain. Typically, transforms include the Karhunen-Loève Transform (KLT), the Discrete Cosine Transform ("DCT"), the Singular Value Decomposition Transform ("SVD") and the asymmetric discrete sine transform (ADST).

The quantization block 220 may be configured to reduce the data in each transformation coefficient. Quantization may involve mapping values within a relatively large range to values in a relatively small range, thus reducing the amount of data needed to represent the quantized transform coefficients. The quantization block 220 may convert the transform coefficients into discrete quantum values, which are referred to as quantized transform coefficients or quantization levels. For example, the quantization block 220 may be configured to add zeros to the data associated with a transformation coefficient. For example, an encoding standard may define 128 quantization levels in a scalar quantization process.

The quantized transform coefficients are then entropy encoded by entropy encoding block 225. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 2A is present to ensure that both the video encoder 125 and the video decoder 175 (described below with regard to FIG. 2B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 230 and inverse transforming the inverse quantized transform coefficients at the inverse transform block 235 in order to produce a derivative residual block (derivative residual). At the reconstruction block 240, the prediction block that was predicted at the prediction block 210 can be added to the derivative residual to create a reconstructed block. A loop filter 245 can then be applied to the reconstructed block to reduce distortion such as blocking artifacts.

The video encoder 125 described above with regard to FIG. 2A includes the blocks shown. However, example embodiments are not limited thereto. Additional blocks may be added based on the different video encoding configurations and/or techniques used. Further, each of the blocks shown in the video encoder 125 described above with regard to FIG. 2A may be optional blocks based on the different video encoding configurations and/or techniques used.

FIG. 2B is a schematic block diagram of a decoder 175 configured to decode compressed video bits 10 (or compressed image bits). Decoder 175, similar to the reconstruction path of the encoder 125 discussed previously, includes an entropy decoding block 250, an inverse quantization block 255, an inverse transform block 260, a reconstruction block 265, a loop filter block 270, a prediction block 275 and a deblocking filter block 280.

The data elements within the compressed video bits 10 can be decoded by entropy decoding block 250 (using, for example, Context Adaptive Binary Arithmetic Decoding) to produce a set of quantized transform coefficients. Inverse quantization block 255 dequantizes the quantized transform coefficients, and inverse transform block 260 inverse transforms (using ADST) the dequantized transform coefficients to produce a derivative residual that can be identical to that created by the reconstruction stage in the encoder 125.

Using header information decoded from the compressed video bits 10, decoder 175 can use prediction block 275 to create the same prediction block as was created in encoder 175. The prediction block can be added to the derivative residual to create a reconstructed block by the reconstruction block 265. The loop filter block 270 can be applied to the reconstructed block to reduce blocking artifacts. Deblocking filter block 280 can be applied to the reconstructed block to reduce blocking distortion, and the result is output as video stream 5.

The video decoder 175 described above with regard to FIG. 2B includes the blocks shown. However, example embodiments are not limited thereto. Additional blocks may be added based on the different video encoding configurations and/or techniques used. Further, each of the blocks shown in the video decoder 175 described above with regard to FIG. 2B may be optional blocks based on the different video encoding configurations and/or techniques used.

The encoder 125 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition (e.g., move her head or eyes) in any direction (e.g., up, down, left, right, or any combination thereof) and continuously see a portion of the image.

A spherical image can have perspective. For example, a spherical image could be an image of a globe. An inside perspective could be a view from a center of the globe looking outward. Or the inside perspective could be on the globe looking out to space. An outside perspective could be a view from space looking down toward the globe. As another example, perspective can be based on that which is viewable. In other words, a viewable perspective can be that which can be seen by a viewer. The viewable perspective can be a portion of the spherical image that is in front of the viewer. For example, when viewing from an inside perspective, a viewer could be lying on the ground (e.g., earth) and looking out to space. The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

A viewable perspective from an outside perspective may be a portion of the spherical image that is not blocked (e.g., by another portion of the image) and/or a portion of the spherical image that has not curved out of view. Another portion of the spherical image may be brought into a viewable perspective from an outside perspective by moving (e.g., rotating) the spherical image and/or by movement of the spherical image. Therefore, the viewable perspective is a portion of the spherical image that is within a viewable range of a viewer of the spherical image.

A spherical image is an image that dos not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earths rotation) and/or an airplane streak across the image (e.g., the sky).

Figure 3:
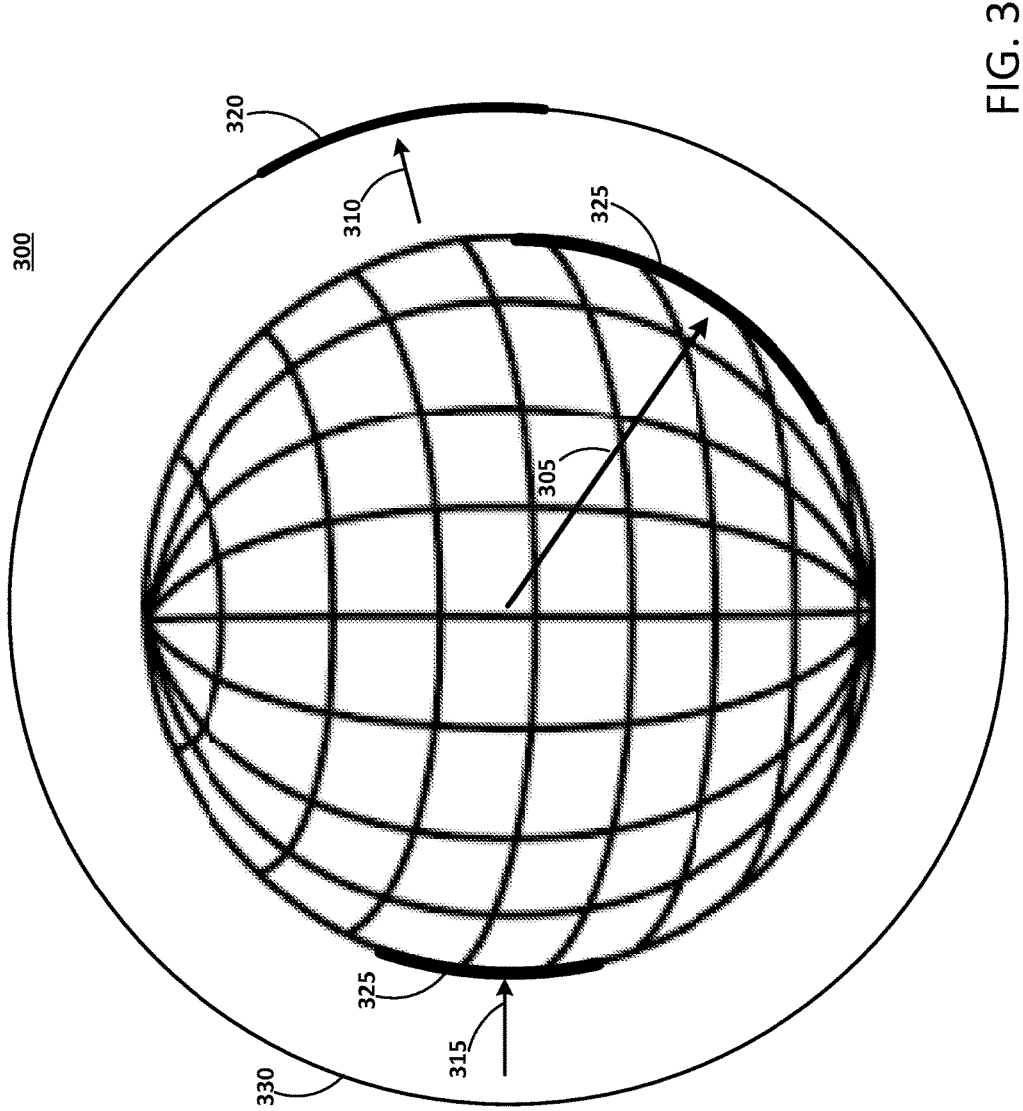
FIG. 3 illustrates a two dimensional (2D) representation of a sphere according to at least one example embodiment.

FIG. 3 is a two dimensional (2D) representation of a sphere. As shown in FIG. 3, the sphere 300 (e.g., as a spherical image) illustrates a direction of inside perspective 305, 310, outside perspective 315 and viewable perspective 320, 325, 330. The viewable perspective 320 may be a portion of a spherical image 335 as viewed from inside perspective 310. The viewable perspective 320 may be a portion of the sphere 300 as viewed from inside perspective 305. The viewable perspective 325 may be a portion of the sphere 300 as viewed from outside perspective 315.

Figure 4A:
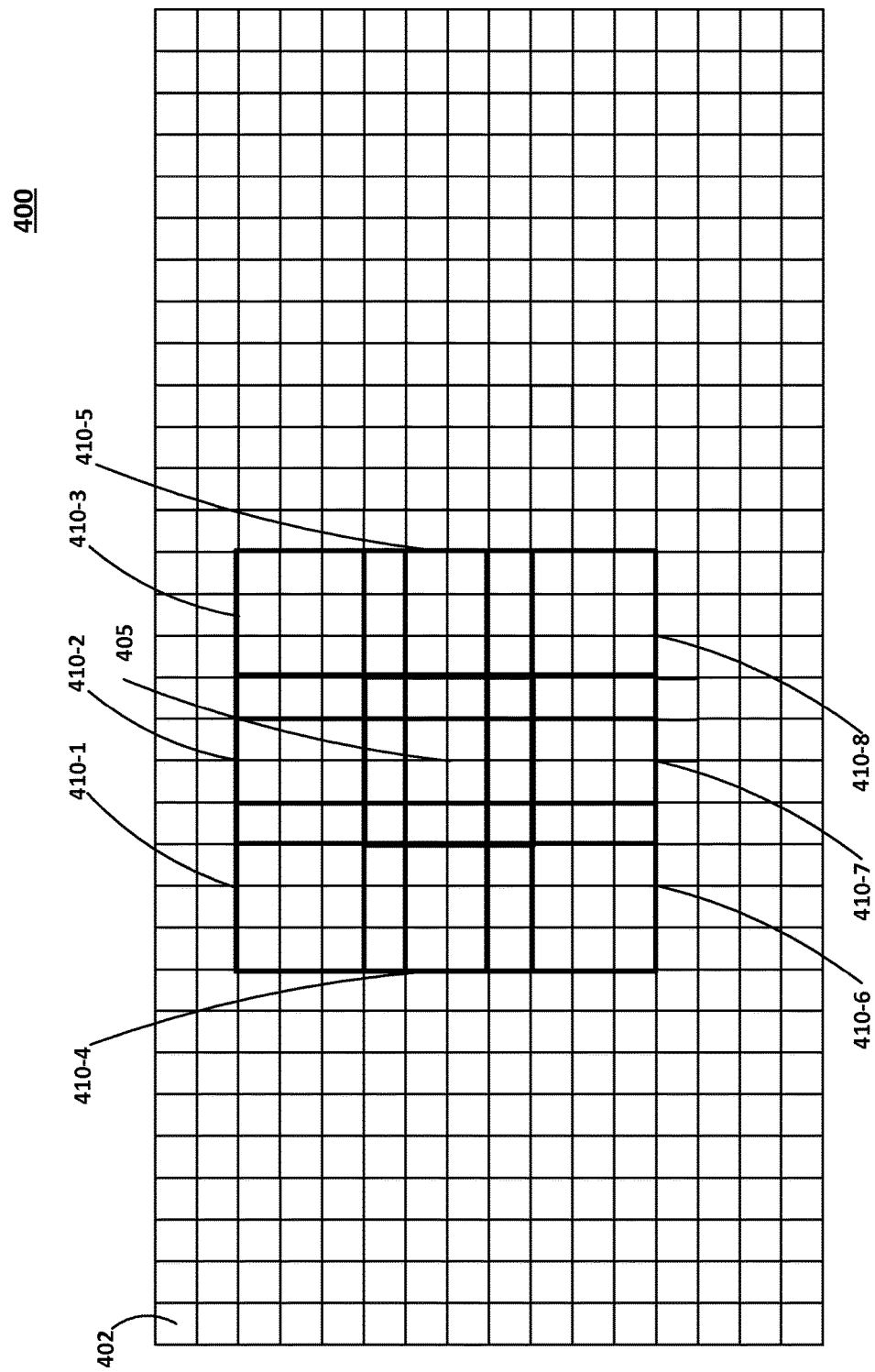
FIGS. 4A and 4B illustrate a 2D representation of a spherical video frame or image including tiles according to at least one example embodiment.
Figure 4B:
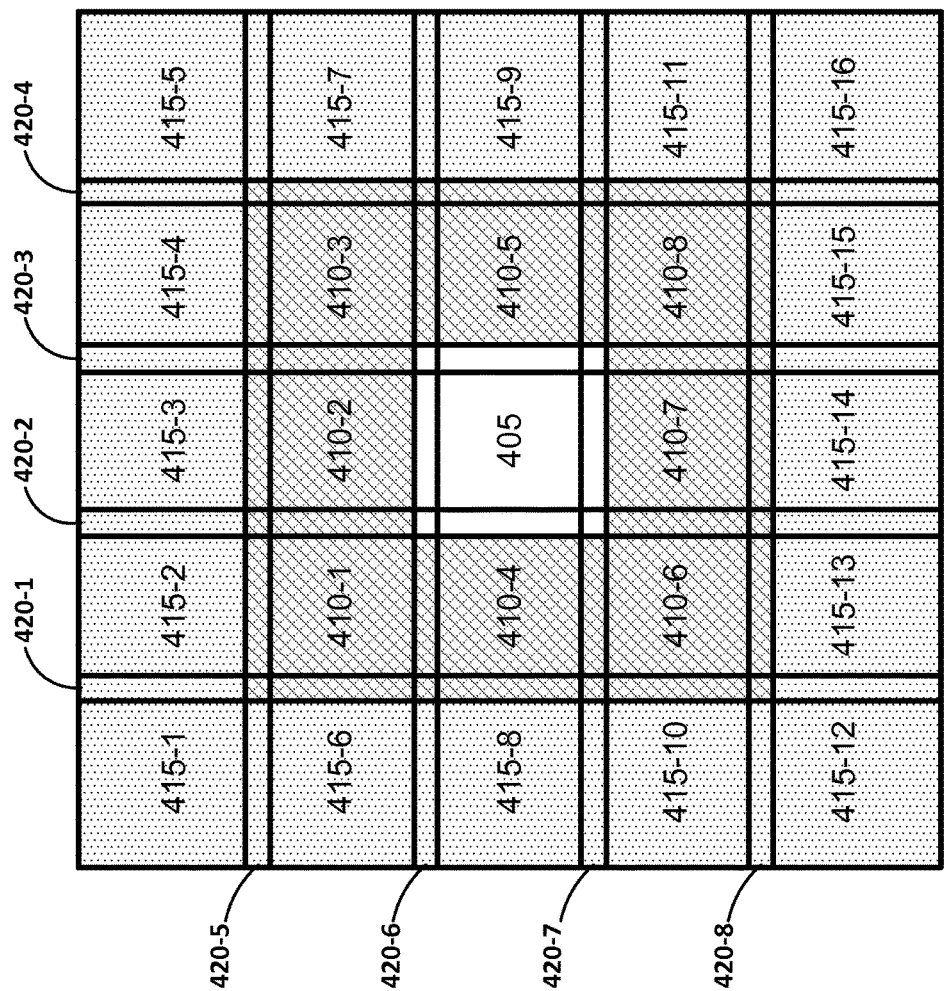

FIGS. 4A and 4B illustrate a 2D representation of a spherical video frame or image including tiles according to at least one example embodiment. As shown in FIG. 4A, the 2D representation of a spherical video frame 400 includes a plurality of blocks (e.g., block 402) organized in a C×R matrix. Each block may be an N×N block of pixels. For example, a video frame (or image) may be converted to a matrix of blocks each having a number of pixels. A tile may be formed of a number of blocks or pixels. For example, tiles 405, 410-1, 410-2, 410-3, 410-4, 410-5, 410-6, 410-7 and 410-8 each include 16 blocks which in-turn include a plurality (e.g., N×N) pixels. Tile 405 may be a tile that includes a view perspective of a viewer of the video (or image) during a playback of the spherical video. In other words, tile 405 may be a tile that includes a portion of the spherical video frame that a viewer of the spherical video can see (e.g., the viewable perspective). Tiles 410-1, 410-2, 410-3, 410-4, 410-5, 410-6, 410-7 and 410-8 may be tiles that include portions of the spherical video frame at a peripheral view or outside (e.g., not seen by a viewer during playback) the view perspective.

According to an example implementation, tiles may over lap. In other words, a block, a portion of a block, a pixel and/or a plurality of pixels may be associated with more than one tile. As shown in FIGS. 4A and 4B, tiles 410-1, 410-2, 410-3, 410-4, 410-5, 410-6, 410-7 and 410-8 may overlap tile 405 (e.g., include a block, a portion of a block, a pixel and/or a plurality of pixels also associated with tile 405). As shown in in FIG. 4B, this overlapping pattern may continue expanding outward from tile 405. For example, tiles 415-1, 415-2, 415-3, 415-4, 415-5, 415-6, 415-7, 415-8, 415-9, 415-10, 415-11, 415-12, 415-13, 415-14, 415-15 and/or 415-16 can overlap one or more of tiles 410-1, 410-2, 410-3, 410-4, 410-5, 410-6, 410-7 and/or 410-8. As shown in FIG. 4B, the overlap is illustrated as overlap video portions 420-1, 420-2, 420-3, 420-4, 420-5, 420-6, 420-7 and 420-8.

According to an example implementation, in order to conserve resources during the streaming of spherical video, only a portion of the spherical video can be streamed. For example, the portion of the spherical video that is indicated as being viewed by a viewer during playback can be streamed. Referring to FIG. 4B, the tile 405 may be a tile that is indicated as a portion of the spherical video frame that a viewer of the spherical video is watching. Therefore, for a minimum viewing experience, the tile 405 should be streamed. However, should the viewer change what is being watched (e.g., by moving her eyes or her head) and only tile 405 is being streamed, the viewing experience will be undesirable because the viewer would have to wait for the appropriate spherical video to be streamed. For example, if the viewer changes a view perspective from tile 405 to tile 410-2 and only tile 405 is being streamed, the viewer may experience a delay until tile 410-2 is streamed.

Therefore, according to at least one example embodiment, a plurality of tiles (e.g., as a portion of the spherical video frame) can be streamed. Again referring to FIG. 4B, tiles 405, 410-1, 410-2, 410-3, 410-4, 410-5, 410-6, 410-7, 410-8, 415-1, 415-2, 415-3, 415-4, 415-5, 415-6, 415-7, 415-8, 415-9, 415-10, 415-11, 415-12, 415-13, 415-14, 415-15 and/or 415-16 can be streamed. Further, in order to conserve resources during the streaming of the spherical video, the plurality of tiles can be encoded based on more than one quality of service (QoS). As discussed below, the QoS may affect resources used to encode a tile or tiles, the bandwidth used to stream a tile or tiles, the QoS may also affect the resolution of the tile and/or tiles when decoded. For example, tile 405 can be streamed based on a first QoS, tiles 410-1, 410-2, 410-3, 410-4, 410-5, 410-6, 410-7 and 410-8 can be streamed based on a second QoS, and tiles 415-1, 415-2, 415-3, 415-4, 415-5, 415-6, 415-7, 415-8, 415-9, 415-10, 415-11, 415-12, 415-13, 415-14, 415-15 and 415-16 can be streamed based on a third QoS. The first QoS, the second QoS and the third QoS can be different. For example, the first QoS can be higher than the second QoS and the third QoS can be lower than the first and the second QoS.

Accordingly, decoded tiles corresponding to tiles 415-1, 415-2, 415-3, 415-4, 415-5, 415-6, 415-7, 415-8, 415-9, 415-10, 415-11, 415-12, 415-13, 415-14, 415-15 and/or 415-16 are of a lower quality as compared to decoded tiles corresponding to tiles 410-1, 410-2, 410-3, 410-4, 410-5, 410-6, 410-7 and 410-8. Further, a decoded tile corresponding to tile 405 has the highest quality. As a result, the portion of the spherical video that is indicated as being viewed by a viewer during playback (e.g., the 405) can have the highest relative quality. Further, the portion of the spherical video that is at a peripheral view or outside (e.g., not seen by a viewer during playback) the view perspective during playback can progressively have a lower quality as compared to the portion of the spherical video (or near by) that is indicated as being viewed by a viewer during playback.

Therefore should the viewer change what is being watched (e.g., by moving her eyes or her head), the viewer continues to see the streamed spherical video (although at a possible lower quality). A subsequently streamed frame of the can then include a peripheral view based on the changed position, thus maintaining a desired user experience while conserving resources during the streaming of the spherical video.

In an example implementation, tile 405 can be of a first dimension N1×N1; tiles 410-1, 410-2, 410-3, 410-4, 410-5, 410-6, 410-7 and 410-8 can be of a second dimension N2×N2; and tiles 415-1, 415-2, 415-3, 415-4, 415-5, 415-6, 415-7, 415-8, 415-9, 415-10, 415-11, 415-12, 415-13, 415-14, 415-15 and 415-16 can be of a third dimension N3×N3. Further, overlaps closer to tile 405 can be smaller than overlaps further away from tile 405. For example, the overlap between tile 405 and tile 410-5, can be 0 or 1 pixel, whereas the overlap between tile 410-5 and tile 415-9, can be 50 pixels. This pattern can continue extending away from tile 405. The choice of 0, 1 and 50 are exemplary in nature and example embodiments are limited thereto.

If tile 405 is smaller (e.g., a smaller length by width) than tile 410-5, encoding tile 410-5 is more efficient than encoding tile 405. Accordingly, additional efficiencies can be gained by configuring the generation of tiles such that the tiles get larger (e.g., a larger length by width) and the overlaps get larger the further away from the tile that includes a view perspective of a viewer of the video (or image) during a playback of the spherical video.

Figure 5:
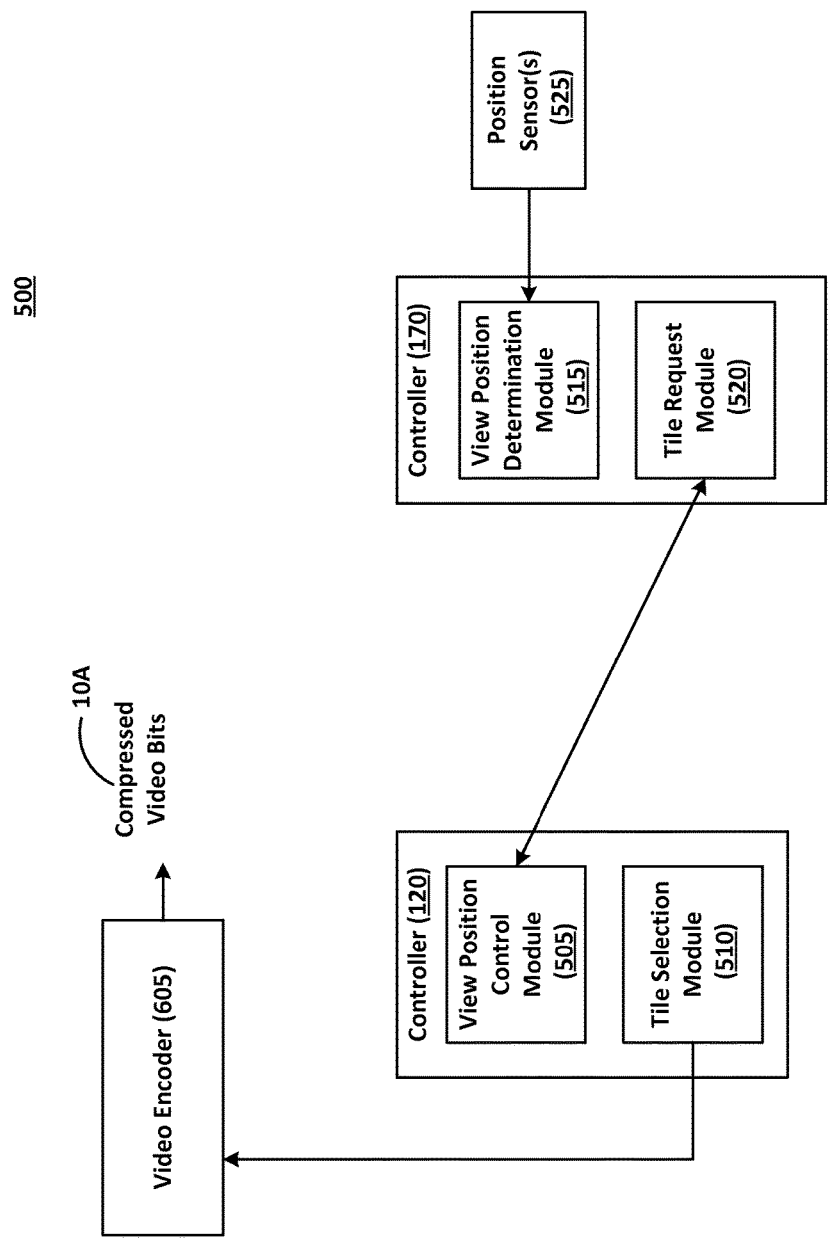
FIG. 5 illustrates a system according to at least one example embodiment.

FIG. 5 illustrates a system 500 according to at least one example embodiment. As shown in FIG. 5, the system 500 includes the controller 120, the controller 170, the encoder 605 (described in detail below) and a position sensor 525. The controller 120 further includes a view position control module 505 and a tile selection module 510. The controller 170 further includes a view position determination module 515 and a tile request module 520.

According to an example implementation, the position sensor 525 detects a position (or change in position) of a viewers eyes (or head), the view position determination module 515 determines a view, perspective or view perspective based on the detected position and the tile request module 520 communicates the view, perspective or view perspective as part of a request for a frame of spherical video, a tile or a plurality of tiles. According to another example implementation, the position sensor 525 detects a position (or change in position) based on an image panning position as rendered on a display. For example, a user may use a mouse, a track pad or a gesture (e.g., on a touch sensitive display) to select, move, drag, expand and/or the like a portion of the spherical video or image as as rendered on the display.

The request for the frame of spherical video, the tile or the plurality of tiles may be communicated together with a request for a frame of the spherical video. The request for the tile may be communicated separate from a request for a frame of the spherical video. For example, the request for the tile may be in response to a changed view, perspective or view perspective resulting in a need to replace previously requested and/or a queued tile, plurality of tiles and or frame.

The view position control module 505 receives and processes the request for the tile. For example, the view position control module 505 can determine a frame and a position of the tile or plurality of tiles in the frame based on the view perspective. Then the view position control module 505 can instruct the tile selection module 510 to select the tile and/or plurality of tiles. Selecting the tile and/or plurality of tiles can include passing a parameter to the encoder 605. The parameter can be used by the view selection module 620 during the encoding of the spherical video and/or tile.

Accordingly, the position sensor 525 can be configured to detect a position (orientation, change in position and/or change in orientation) of a viewer's eyes (or head). For example, the position sensor 525 can include an accelerometer in order to detect movement and a gyroscope in order to detect position. Alternatively, or in addition to, the position sensor 525 can include a camera or infra-red sensor focused on the eyes or head of the viewer in order to determine a position of the eyes or head of the viewer. The position sensor 525 can be configured to communicate position and change in position information to the view position determination module 515.

The view position determination module 515 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 505 using, for example, a Hypertext Transfer Protocol (HTTP).

The view position control module 505 may be configured to determine a view position (e.g., frame and position within the frame) of a tile or plurality of tiles within the spherical video. For example, the view position control module 505 can select a square or rectangle centered on the view position, point or focal point (e.g., latitude and longitude position or side). The tile selection module 510 can be configured to select the square or rectangle as a block, a tile or a plurality of tiles. The tile selection module 510 can be configured to instruct (e.g., via a parameter or configuration setting) the encoder 605 to encode the selected tile or plurality of tiles.

FIG. 6A illustrates a flow diagram for a video encoder system according to at least one example embodiment. The video encoder 605 includes a spherical to 2D representation block 610, a frame decomposition module 615, a view selection module 620, a tile module 625, the video encoder 125 and a packet builder (or combiner) 630. The elements 610-630, 125 contained in the encoder 605 may include software modules, hardware components, or combinations thereof. The encoder 605 may be used in place of the encoder 125 in system 100. Accordingly, the controller 120 may instruct (or invoke) the elements 610-630, 125 to encode the spherical video frames.

The spherical to 2D representation block 610 may be configured to map a spherical frame or image to a 2D representation of the spherical frame or image. For example, the sphere 300 can be projected onto a 2D surface (e.g., a cylinder (unwrapped into a rectangle), a square and/or a rectangle). The projection can be, for example, based on an equirectangular projection equation.

The frame decomposition module 615 may be configured to decompose each of the spherical video frames into a plurality of blocks (e.g., block 402) having a first set of dimensions N×N. Accordingly, the frame decomposition module 615 may be configured to decompose (e.g., based on a quad-tree decomposition) the spherical video frames.

The view selection module 620 may be configured to select a tile (or plurality of tiles) based a view or perspective or view perspective of a user watching the spherical video. For example, as discussed above, the view, perspective or view perspective may be a viewable perspective 320 which in turn may be a portion of the sphere 300 as viewed from inside perspective 305. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may two dimensional or substantially two dimensional. The view selection module 620 may select a tile (or plurality of tiles) based on an indication of a view or perspective or view perspective from a device playing back the spherical video.

The tile module 625 may select a plurality of tiles based on the tile selected by the view selection module 620. The tile module 625 may select tiles that surround and extend away from the tile selected by the view selection module 620 (e.g., the 405) for inclusion in the plurality tiles. For example, as shown in FIG. 4B, the plurality of tiles may include two rows above and two rows below, as well as two columns to the left and two columns to the right of the tile selected by the view selection module 620 (e.g., the 405). The plurality of tiles may overlap. The tile module 625 may be configured to assign a QoS to each of the plurality of tiles. The tile module 625 may be configured to, in a loop, pass each of the tiles and parameters associated with the QoS for each tile to the encoder 125.

For example, the tile module 625 may read the blocks (e.g., the pixels) associated with each tile and store the blocks and QoS in a queue and output the contents of the queue one entry at a time (e.g., as instructed or invoked by the controller 120). The encoder 125 may encode the blocks of a tile using the parameters associated with the QoS and output the results to the packet builder 630. The encoder 125 may encode each of the plurality of tiles separately. The packet builder 630 may also include a queue in order to queue the results until each of the plurality of tiles is encoded. In another example implementation, the encoder 605 may include a plurality of video encoders 125 (or a plurality of software implementations of the video encoder 125) such that the plurality of tiles can be encoded in parallel.

The packet builder 630 may be configured to build a packet for transmission. The packet may include compressed video bits 10A. The packet may include the plurality of encoded tiles. The packet may include a header for transmission. The header may include, amongst other things, the information indicating the mode or scheme use in intra-frame coding by the encoder. The header may include information indicating parameters used to convert a frame of the spherical video frame to a 2-D rectangular representation. The header may include information indicating parameters used to achieve the QoS of (e.g., each of) the plurality of encoded 2-D tiles.

In one example implementation, the packet builder 630 can build a packet that includes only the plurality of encoded tiles as the encoded bits. In another implementation, the packet builder 630 can build a packet that mimics an encoded frame of spherical video data (or a spherical image). Accordingly, the packet builder 630 may fill in a mimicked frame with dummy data in data (or bit) locations (of the frame) that are not associated with the plurality of encoded tiles. For example, the packet builder 630 could include a template for an encoded frame, map bits associate with the plurality of encoded tiles to a position in the template corresponding to the plurality of encoded tiles and assign the remainder of the positions in the template with dummy data (e.g., a value of 0).

FIG. 6B illustrates a flow diagram for a video decoder system according to at least one example embodiment. The video decoder 650 includes a frame builder module 655, the video decoder 175 and a 2D representation to spherical block 660. The elements 655, 175, 660 contained in the decoder 650 may include software modules, hardware components, or combinations thereof. The decoder 650 may be used in place of the decoder 175 in system 150. Accordingly, the controller 170 may instruct (or invoke) the elements 655, 175, 660 to encode the spherical video frames.

The frame builder module 655 may be configured to build a frame that mimics an encoded frame of spherical video data (or a spherical image). For example, the frame builder module 655 may fill in a mimicked frame with dummy data in data (or bit) locations (of the frame) that are not associated with the plurality of encoded tiles. For example, the frame builder module 655 could include a template for an encoded frame, map bits associate with the plurality of encoded tiles to a position in the template corresponding to the plurality of encoded tiles and assign the remainder of the positions in the template with dummy data (e.g., a value of 0).

The 2D representation to spherical block 660 may be configured to map a 2D representation of a spherical frame or image to a spherical frame or image. For example, FIG. 3 illustrates the sphere 300 (e.g., as a frame or an image). The sphere 300 could have been previously projected onto the surface of a cylinder (that can be unwrapped to a rectangle), a square or a rectangle. The projection can be, for example, equirectangular or semi-equirectangular. The mapping of the 2D representation of a spherical frame or image to the spherical frame or image can be the inverse of the previous mapping.

FIG. 6C illustrates a flow diagram for a video decoder system according to at least one example embodiment. The video decoder 670 includes the video decoder 175 and the 2D representation to spherical block 660. The elements 175, 660 contained in the decoder 670 may include software modules, hardware components, or combinations thereof. The decoder 670 may be used in place of the decoder 175 in system 150. Accordingly, the controller 170 may instruct (or invoke) the elements 175, 660 to encode the spherical video frames.

In an example implementation, the decoder 650 may be used in a system where the encoder 605 communicates packets as compressed video bits 10A, where the packets only data corresponding to the spherical video is the plurality of encoded tiles. In another example implementation, the decoder 670 may be used in a system where the encoder 605 communicates packets as compressed video bits 10A, where the packets include data that mimics an encoded video frame that includes data corresponding to the spherical video including the plurality of encoded tiles.

As will be appreciated, the system 100 and 150 illustrated in FIGS. 1A and 1B, the encoders 125, 605 illustrated in FIGS. 2A and 6A, as well as the decoders 175, 650, 670 illustrated in FIGS. 2B, 6B and 6C may be implemented as an element of and/or an extension of the generic computer device 900 and/or the generic mobile computer device 950 described below with regard to FIG. 9. Alternatively, or in addition to, the system 100 and 150 illustrated in FIGS. 1A and 1B, the encoders 125, 605 illustrated in FIGS. 2A and 6A, as well as the decoders 175, 650, 670 illustrated in FIGS. 2B, 6B and 6C may be implemented in a separate system from the generic computer device 900 and/or the generic mobile computer device 950 having some or all of the features described below with regard to the generic computer device 900 and/or the generic mobile computer device 950.

Figure 7:
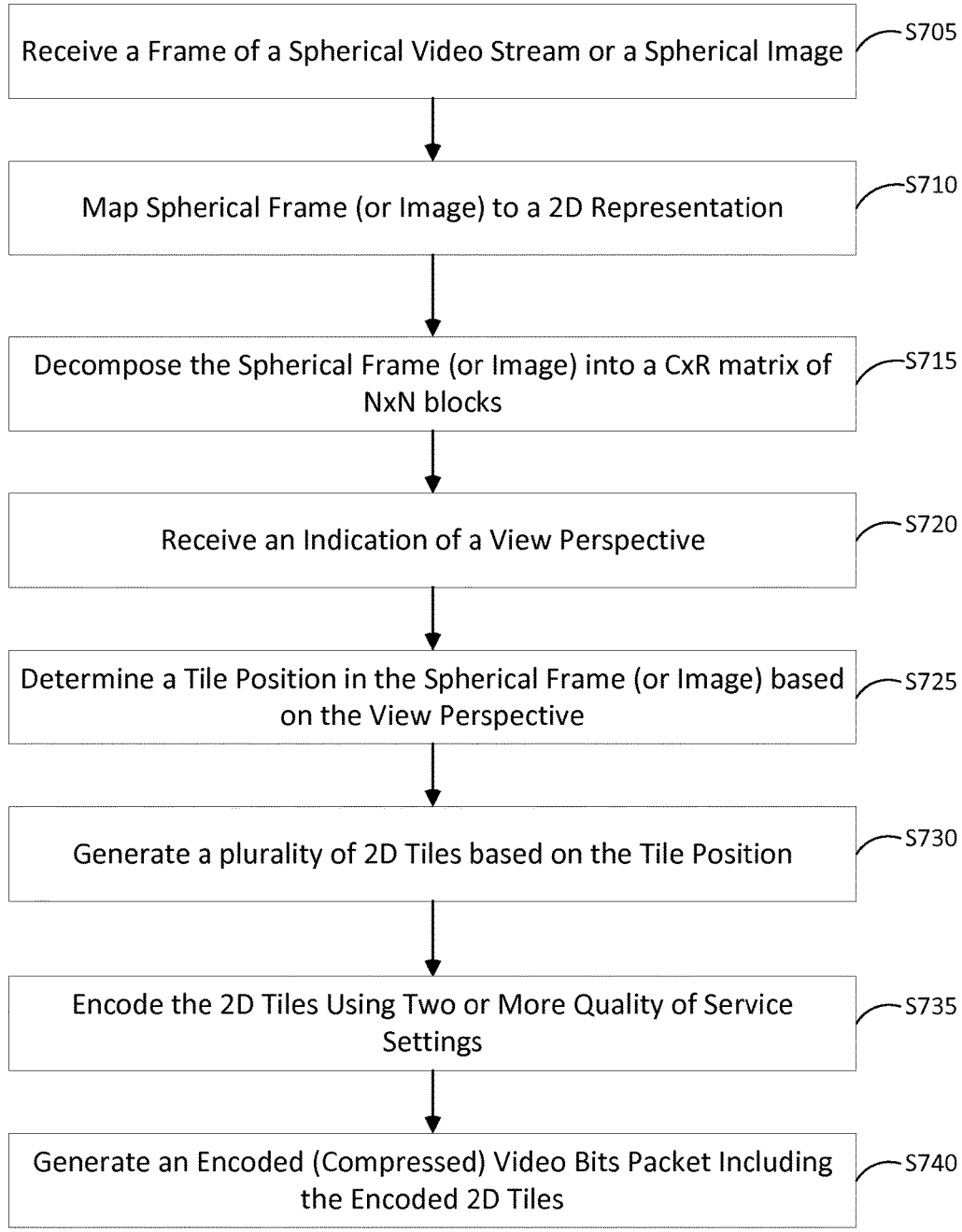
FIGS. 7 and 8 illustrate methods for encoding/decoding streaming spherical video according to at least one example embodiment.
Figure 8:
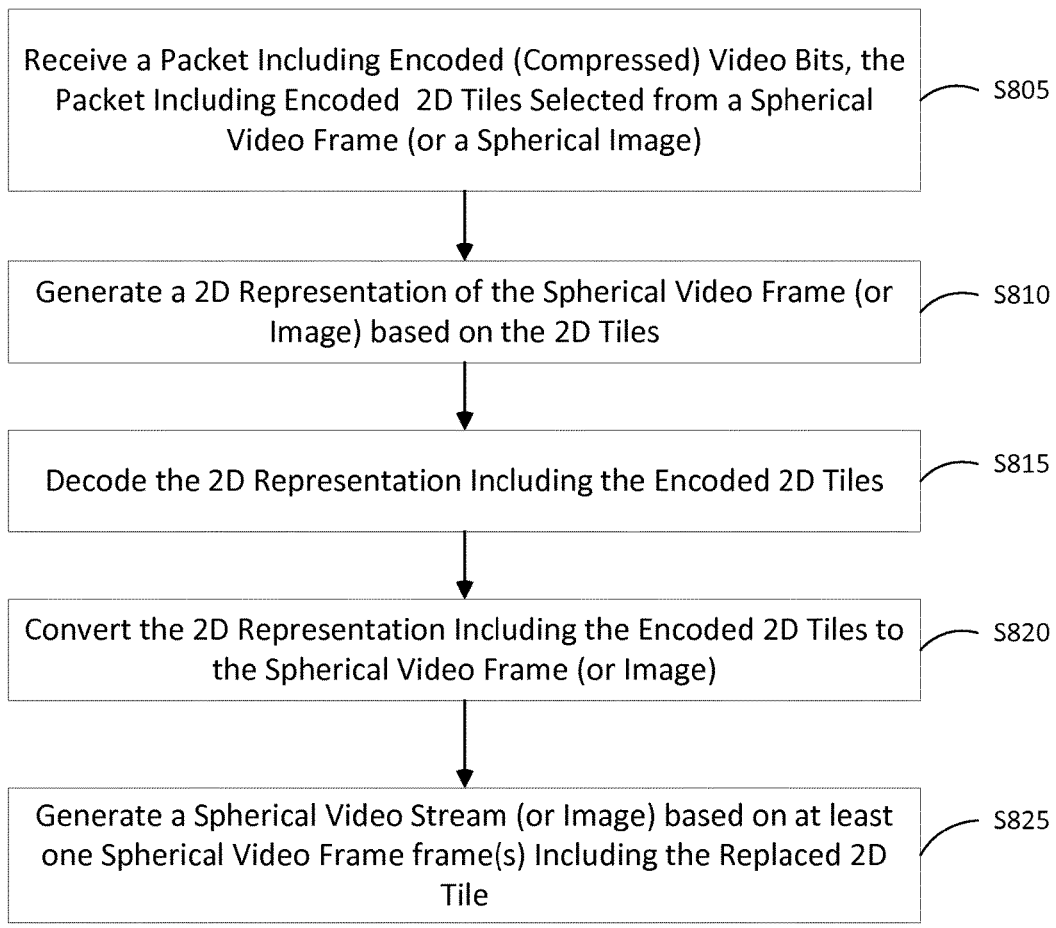

FIGS. 7 and 8 are flowcharts of methods according to example embodiments. The steps described with regard to FIGS. 7 and 8 may be performed due to the execution of software code stored in a memory (e.g., at least one memory 110) associated with an apparatus (e.g., as shown in FIG. 1) and executed by at least one processor (e.g., at least one processor 105) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 7 and 8.

FIG. 7 illustrates a method for encoding streaming spherical video according to at least one example embodiment. As shown in FIG. 7, in step S705 a frame of a spherical video stream (or a spherical image) is received. For example, a controller (e.g., controller 120) may instruct an encoder (e.g., encoder 125, 605) to receive one or more frames from a video source(s). The video source(s) the may include any video source (e.g., a data storage device, a network, the Internet, a separate computing device, and the like). For example, the video sequence frame(s) may be video frames associated with a spherical video stream (e.g., video stream 5). The video stream may be a real time video stream (e.g., a video conference or a video chat). For example, the video stream may be a previously recorded video (e.g., a movie or a video recorder recording). In addition, the video content may be analog or digital video.

In step S710 the spherical frame (or image) is mapped to a 2D representation. For example, mapping a frame (or spherical image) to a 2D representation can include projecting the frame (or spherical image) onto the surface of a cylinder (which is then unwrapped into a rectangle), a square or rectangle. In one example implementation, the projection can be equirectangular. In other words, pixels along a line at the center of the sphere (e.g., an equator) are mapped to an equidistant line between the top and the bottom of the cylinder, square or rectangle. Then, moving away from the line (e.g., up and down from the line), each horizontal line is mapped to the cylinder as a straight line across the middle of the image with the vertical line remaining vertical. As the horizontal line gets closer and closer to the poles of the sphere, the image can be stretched to fit to the cylinder, the square or the rectangle. Other projections are contemplated. For example, a semi-equirectangular projection could be used. A semi-equirectangular may scale the amount of the aforementioned stretch such that the projection does not completely fill the cylinder, the square or the rectangle.

In step S715 the frame including the 2D representation is decomposed into a C×R matrix of N×N blocks or macroblocks. For example, the controller 120 may instruct the encoder (e.g., the frame decomposition module 615) to decompose the spherical video frames into a C×R matrix of macroblocks having N×N dimensions. For example, the encoder can use a quadtree decomposition technique to decompose the frame including the 2D representation (or image).

In step S720 an indication of a view perspective is received. The indication of the view perspective can be received from a device executing a playback of the spherical video. In other words, the indication of the view perspective can be received from a device implementing a decoder (e.g., decoder 175, 650, 670) in order for a viewer to view the spherical video. For example, as discussed above, the indication of a view perspective can be based on a portion of a spherical video that a viewer is currently looking at. The indication can be, for example, a point or position (e.g., longitude and latitude) on the sphere, a plurality of points on the sphere, or a side of a cube representing the sphere.

In an example implementation, the indication of a view perspective is received before the spherical frame (or image) is mapped to a 2D representation. In this implementation, the spherical frame (or image) can be rotated such that the view perspective is centered along, for example, the line at the center of the sphere (e.g., along the equator). As a result, the pixels, blocks and/or macro-blocks (e.g., that make up the tiles described above) can be in a position such that any distortion of the pixels, blocks and/or macro-blocks during a projection of the pixels, blocks and/or macro-blocks onto the surface of the cylinder, rectangle or square can be minimized.

In step S725 a tile position in the spherical frame is determined based on the view perspective. For example, if the indication is a point or position on the sphere (as a spherical image or frame), a tile (e.g., a number of pixels, a block and/or a macro-block) can be determined based on point or position. In an example implementation, the tile (at least one tile or a plurality of tiles) position can be a rectangle centered on the point or position.

In step S730 a plurality of 2D tiles are generated based on the tile position. For example, as discussed above, the 2D tiles can be an image including a plurality of pixels or blocks. The 2D tiles can include a portion of the frame of the spherical video. The plurality of 2D tiles are generated can be generated by selecting a first portion of the frame of the spherical video as a first two dimensional tile (e.g., the 405) based on the tile position and selecting a plurality of second two dimensional tiles from a second portion of the frame of the spherical video (e.g., tiles 410-1 to 8 and/or tiles 415-1 to 16), the second portion of the frame surrounding the first portion of the frame and extending away from the first portion of the frame. In one implementation, the 2D tiles can be generated based on the tile position or view perspective to include the plurality of pixels or blocks included in a square or rectangle centered on the point or position. In another example implementation, the plurality of pixels or blocks that form the plurality of 2D tiles within the frame (or image) are predefined or preconfigured and the 2D tiles can be selected (as the generated 2D tiles) such that at least one of the 2D tiles includes the tile position a center of the tile position or view perspective. In yet another implementation, during the aforementioned rotation of the spherical frame (or image), the spherical frame (or image) can be rotated such that the tile position or view perspective is positioned at the center of the projection onto the surface of the cylinder, rectangle or square. As such, the center tile can be one of the tiles selected (as the generated 2D tiles).

In step S735 the 2D tiles are encoded using two or more QoS settings. For example, the 2D tile may be transformed (encoded or compressed) into transform coefficients using a configured transform (e.g., a KLT, a SVD, a DCT or an ADST). The encoded transform coefficients or set of residual values for the block can be quantized. For example, the controller 120 may instruct (or invoke) the quantization block 220 to quantize coded motion vectors and the coded residual errors, through any reasonably suitable quantization techniques. In addition, the controller 120 may instruct the entropy coding block 220 to, for example, assign codes to the quantized motion vector codes and residual error codes to match code lengths with the probabilities of the quantized motion vector codes and residual error codes, through any coding technique. The encoder 125 (as implemented in encoder 605) may encode each of the plurality of 2D tiles separately.

In an example implementation, a different quality (or quality of service (QoS)) may be used on a tile (of the plurality of tiles) that includes the view perspective as compared to tiles at a peripheral view or outside (e.g., not seen by a viewer during playback) the view perspective. The QoS can be based on compression algorithm, a transmission rate, and/or an encoding scheme. For example, the tile (or tiles) that include the view perspective may be encoded at a higher QoS than the tiles at a peripheral view or outside the view perspective. The QoS may affect the resolution of the a tile and/or tiles when decoded. Accordingly, the tile that includes the view perspective (as a viewable perspective including a portion of the spherical video frame) can be encoded such that the tile that includes the view perspective has a higher resolution (when decoded) as compared to tiles at a peripheral view or outside (e.g., not seen by a viewer during playback) the view perspective (when decoded).

In an example implementation, the plurality of 2D tiles at a peripheral view or outside the view perspective can include tiles of differing dimensions. Further, a larger of the tiles of differing dimensions can be encoded with a lower QoS as compared to a QoS of a smaller of the tiles of differing dimensions. Accordingly, a resolution of decoded tiles associated with 2D tiles at a peripheral view or outside the view perspective can be different based on a size of a tile and/or a position of a tile.

In step S740 an encoded (compressed) video bits packet including the encoded 2D tiles is generated. For example, the packet builder 630 can build a packet for transmission. The packet may include compressed video bits 10A. The packet may include the encoded tiles (e.g., a plurality of tiles). The packet may include a header for transmission. The header may include, amongst other things, the information indicating the mode or scheme use in intra-frame coding by the encoder. The header may include information indicating parameters used to convert a frame of the spherical video frame to a 2-D rectangular representation. The header may include information indicating parameters used to achieve the QoS (e.g., a plurality of QoS) of the encoded tiles.

In one example implementation, the packet builder 630 builds a packet that includes only the plurality of encoded tiles as the encoded bits. In another implementation, the packet builder 630 can build a packet that mimics an encoded complete frame. Accordingly, the packet builder 630 may fill in a mimicked frame with dummy data in data (or bit) locations (of a frame) that are not associated with the plurality of encoded tiles. For example, the packet builder 630 could include a template for an encoded frame, map bits associate with the plurality of encoded tiles to a position in the template corresponding to the plurality of encoded tiles and assign the remainder of the positions in the template with dummy data (e.g., a value of 0).

FIG. 8 illustrates a method for decoding streaming spherical video according to at least one example embodiment. As shown in FIG. 8, in step S805 a packet including encoded (compressed) video bits is received, the packet includes a plurality of encoded 2D tiles selected from a spherical video frame (or spherical image). For example, the packet may include compressed video bits 10A. The packet may include a header for transmission. The header may include, amongst other things, the information indicating the mode or scheme use in intra-frame coding by the encoder. The header may include information indicating parameters used to convert a frame of the spherical video to a 2-D rectangular representation. The header may include information indicating parameters used to achieve the QoS of the plurality of encoded tiles. As discussed above, a different quality (or quality of service (QoS)) may be used on a tile (of the plurality of tiles) that includes the view perspective as compared to tiles at a peripheral view or outside (e.g., not seen by a viewer during playback) the view perspective. For example, the QoS of the tile that includes the view perspective may be higher than the QoS of the tiles at a peripheral view or outside (e.g., not seen by a viewer during playback) the view perspective.

In step S810, in one implementation, a 2D representation of the spherical video frame (or image) based on the 2D tiles can be generated. For example, in this case only the plurality of encoded tiles are received. Therefore, the decoder (e.g., implementing frame builder module 655) may fill in a mimicked frame with dummy data in data (or bit) locations (of a frame) that are not associated with the plurality of encoded tiles. For example, the frame builder module 655 could include a template for an encoded frame, map bits associate with the plurality of encoded tiles to a position in the template corresponding to the plurality of encoded tiles and assign the remainder of the positions in the template with dummy data (e.g., a value of 0).

In step S815 the 2D representation, including the plurality of encoded tiles, is decoded. For example, a video decoder (e.g., decoder 175, 650, 670) entropy decodes the encoded 2D representation. For example, the compressed video bits can be decoded by entropy decoding using, for example, Context Adaptive Binary Arithmetic Decoding to produce a set of quantized transform coefficients. The video decoder dequantizes the transform coefficients given by the entropy decoded bits. For example, the entropy decoded video bits can be de-quantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST). The video decoder can filter the reconstructed pixel in the video frame. For example, a loop filter can be applied to the reconstructed block to reduce blocking artifacts. For example, a deblocking filter can be applied to the reconstructed block to reduce blocking distortion. Decoding the 2D representation can include using (each of) the QoS as input parameters for the decoding scheme or codec.

In step S820 the 2D representation is converted to the spherical video frame. For example, the decoded 2D representation can be converted to a spherical video frame (or image). For example, the 2D representation can be converted using the inverse of the technique described above with regard to mapping a spherical frame (or image) to a 2D representation of the spherical frame (or image).

In step S825 a spherical video stream (or spherical image) is generated based on at least one spherical video frame frame(s) including the decoded plurality of tiles. For example, at least one video frame of reconstructed converted pixels of the spherical video, including the decoded plurality of tiles, may be organized in a sequence to form a spherical video stream. As discussed above, the tile (of the plurality of tiles) that includes the view perspective was encoded with a higher QoS than the tiles at a peripheral view or outside (e.g., not seen by a viewer during playback) the view perspective. Accordingly, the generating of the spherical video stream including may result in the visible portion of the spherical video stream being of a higher quality than the peripheral or non-visible portion of the spherical video stream during a playback of the spherical video stream.

In an example implementation, if the view perspective as seen by the viewer changes during the streaming (and/or decoding) of the spherical video or image, an indication of the changed view perspective can be triggered and sent to a device executing an encoding of the spherical video.

Figure 9:
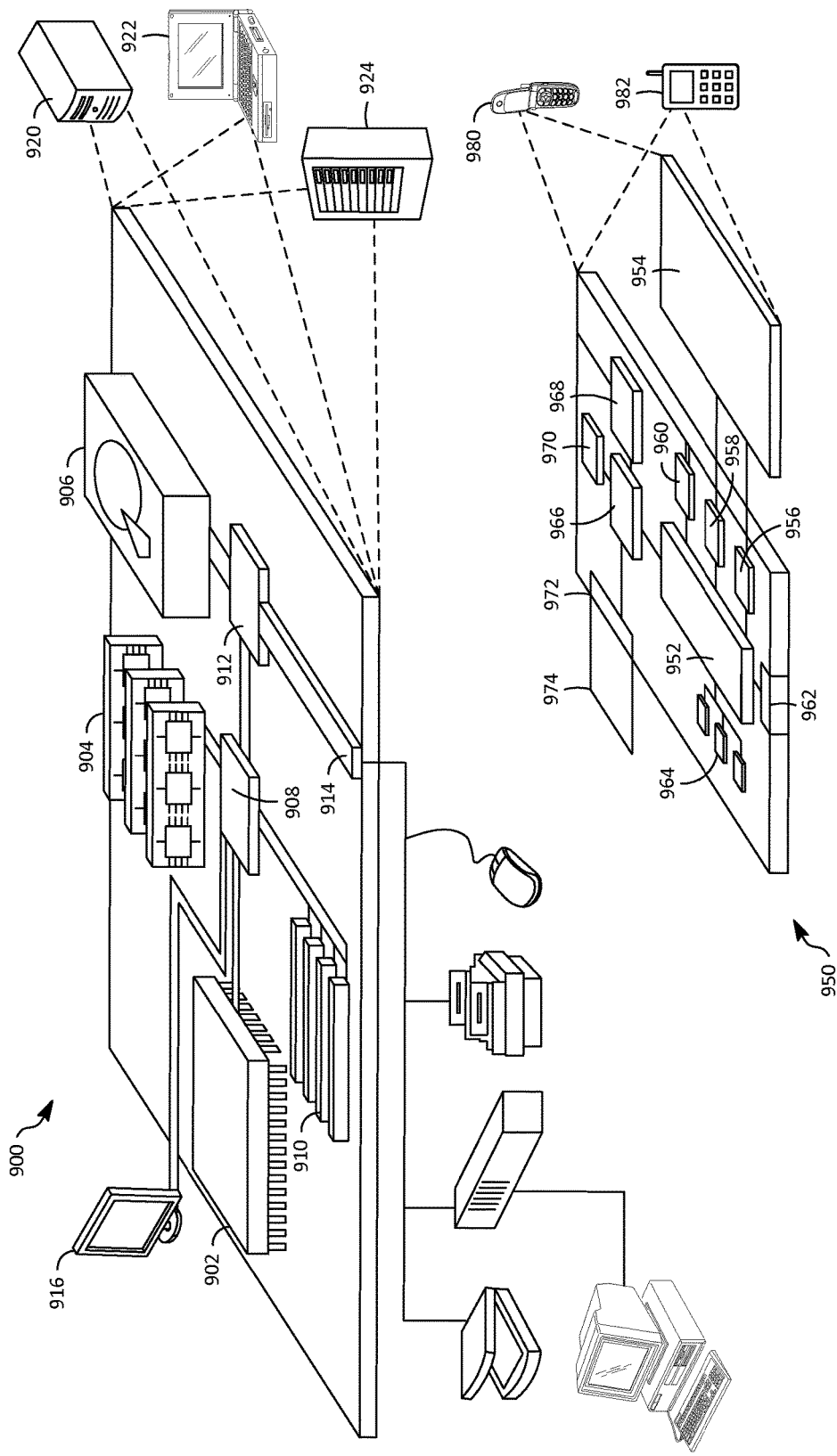
FIG. 9 is a schematic block diagram of a computer device and a mobile computer device that can be used to implement the techniques described herein.

FIG. 9 is a schematic block diagram of a computer device and a mobile computer device that can be used to implement the techniques described herein. FIG. 9 is an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing partitions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   determining a tile position in a frame of a spherical video based on a view perspective;
   selecting a first portion of the frame of the spherical video as a first two-dimensional tile based on the tile position;
   selecting a second two-dimensional tile and a third two-dimensional tile from a second portion of the frame of the spherical video,
      the second portion of the frame surrounding the first portion of the frame and extending away from the first portion of the frame,
      the second two-dimensional tile being closer to the first two-dimensional tile than the third two-dimensional tile,
      the first two dimensional tile overlapping the second two-dimensional tile,
      the second two-dimensional tile overlapping the third two-dimensional tile, and
      the overlapping of the first two-dimensional tile and the second two-dimensional tile is smaller than the overlapping of the second two-dimensional tile and the third two-dimensional tile;
   encoding the first two-dimensional two dimensional tile using a first quality; encoding the second two-dimensional tile and the third two-dimensional tile using at least one second quality, the first quality being a higher quality than the at least one second quality, and the overlapping of the first two-dimensional tile and the second two-dimensional tile being a higher quality than the overlapping of the second two-dimensional tile and the third two-dimensional tile, wherein the encoding of the first two-dimensional tile, the second two-dimensional tile and the third two-dimensional tile includes separately encoding each tile, the encoding includes:
      generating at least one residual for the two-dimensional tile by subtracting a template from un-encoded pixels of the two-dimensional tile to be encoded;
      encoding the at least one residual by applying a transform to the at least one residual;
      quantizing transform coefficients associated with the encoded at least one residual; and
      entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality; and
   transmitting a packet, as a streaming spherical video, the packet including the encoded first two-dimensional tile, the encoded second two-dimensional tile and the encoded third two dimensional tile.

2. The method of claim 1, further comprising mapping the frame of the spherical video to a two-dimensional representation based on a projection to a surface of a two-dimensional shape.

3. The method of claim 1, wherein the view perspective is based on a viewable portion of the spherical video as seen by a viewer during a playback of the spherical video.

4. The method of claim 1, further comprising receiving an indication of the view perspective from a device executing a playback of the spherical video.

5. The method of claim 1, wherein the packet further includes a header and a mimicked frame including dummy data in data locations of the frame that are not associated with encoded first two-dimensional tile and the second two-dimensional tile and the third two-dimensional tile.

6. The method of claim 1, further comprising selecting a plurality of second two-dimensional tiles, wherein the plurality of second two-dimensional tiles include two or more two-dimensional tiles of different sizes and the two or more two-dimensional tiles overlap each other.

7. The method of claim 1, further comprising selecting a plurality of second two-dimensional tiles, wherein as the plurality of second two-dimensional tiles extend away from the first portion of the frame, the plurality of second two-dimensional tiles includes a fourth tile that has a dimension that is larger as compared to a dimension of a fifth tile that is closer to the first tile.

8. The method of claim 1, further comprising selecting a plurality of second two-dimensional tiles, wherein
   the plurality of second two-dimensional tiles including tiles of differing dimensions, and
   a larger of the tiles of differing dimensions is encoded with a lower quality as compared to a smaller of the tiles of differing dimensions.

9. A non-transitory computer-readable storage medium having stored thereon computer executable program code which, when executed on a computer system, causes the computer system to perform steps comprising:
    determining a tile position in a frame of a spherical video based on a view perspective;
    selecting a first portion of the frame of the spherical video as a first two-dimensional tile based on the tile position;
    selecting a second two-dimensional tile and a third two-dimensional tile from a second portion of the frame of the spherical video,
        the second portion of the frame surrounding the first portion of the frame and extending away from the first portion of the frame,
        the second two-dimensional tile being closer to the first two-dimensional tile than the third two-dimensional tile,
        the first two dimensional tile overlapping the second two-dimensional tile,
        the second two-dimensional tile overlapping the third two-dimensional tile, and
        the overlapping of the first two-dimensional tile and the second two-dimensional tile is smaller than the overlapping of the second two-dimensional tile and the third two-dimensional tile;
    encoding the first two dimensional tile using a first quality;
    encoding the second two-dimensional tile and the third two-dimensional tile using at least one second quality, the first quality being a higher quality than the at least one second quality, and the overlapping of the first two-dimensional tile and the second two-dimensional tile being a higher quality than the overlapping of the second two-dimensional tile and the third two-dimensional tile, wherein the encoding of the first two-dimensional tile, the second two-dimensional tile and the third two-dimensional tile includes separately encoding each tile, the encoding includes:
        generating at least one residual for the two-dimensional tile by subtracting a template from un-encoded pixels of the two-dimensional tile to be encoded;
        encoding the at least one residual by applying a transform to the at least one residual;
        quantizing transform coefficients associated with the encoded at least one residual; and
    entropy encoding the quantized transform coefficients as at least one compressed video bit, wherein at least one of the generating of the at least one residual, the encoding of the at least one residual, the quantizing of the transform coefficients, and the quantizing of the transform coefficients includes setting of at least one parameter based on the first quality; and
    transmitting a packet, as a streaming spherical video, the packet including the encoded first two-dimensional tile, the encoded second two-dimensional tile and the encoded third two dimensional tile.

10. The non-transitory computer-readable storage medium of claim 9, wherein the view perspective is based on a viewable portion of the spherical video as seen by a viewer during a playback of the spherical video.

11. The non-transitory computer-readable storage medium of claim 9, further comprising receiving an indication of the view perspective from a device executing a playback of the spherical video.

12. The non-transitory computer-readable storage medium of claim 9, further comprising selecting a plurality of second two-dimensional tiles, wherein the plurality of encoded second two-dimensional tiles include two or more two-dimensional tiles of different sizes and the two or more two-dimensional tiles overlap each other.

13. The non-transitory computer-readable storage medium of claim 9, further comprising selecting a plurality of second two-dimensional tiles, wherein as the plurality of second two-dimensional tiles extend away from the first portion of the frame, the plurality of second two-dimensional tiles includes a fourth tile that has a dimension that is larger as compared to a dimension of a fifth tile that is closer to the first tile.

* * * * *